United States Patent [19]
Halsted

[11] 4,285,421
[45] Aug. 25, 1981

[54] ELECTROMAGNETIC CLUTCH

[75] Inventor: Edwin H. Halsted, Dayton, Ohio

[73] Assignee: General Motors Corporation, Detroit, Mich.

[21] Appl. No.: 93,182

[22] Filed: Nov. 13, 1979

[51] Int. Cl.³ ............................................. F16D 27/10
[52] U.S. Cl. ............................................... 192/84 C
[58] Field of Search ........................... 192/84 A, 84 C

[56] References Cited

U.S. PATENT DOCUMENTS

| | | | |
|---|---|---|---|
| 3,205,989 | 9/1965 | Mantey | 192/84 C |
| 3,263,784 | 8/1966 | Pierce | 192/84 C |
| 3,361,238 | 1/1968 | Yokel | 192/84 C |
| 3,924,585 | 12/1975 | Woods | 192/84 C X |
| 4,119,184 | 10/1978 | Mower et al. | 192/84 C X |

Primary Examiner—Allan D. Herrmann
Attorney, Agent, or Firm—R. L. Phillips

[57] ABSTRACT

An electromagnetic clutch comprises a pair of cup-like sheet metal housing members facing each other and overlapping at their respective outer peripheries to form a radial air gap. The housings are spaced from each other to form a cavity for receiving an electromagnetic coil. One of the housing members is adapted for installation on a drive shaft while a bearing is affixed with respect to the other housing member such that the housing members may rotate relative to each other. First and second spacers are uniquely positioned in combination with the housing members together with the bearing and the shaft to provide an axial air gap and to control the flux transfer area of the radial air gap.

3 Claims, 3 Drawing Figures

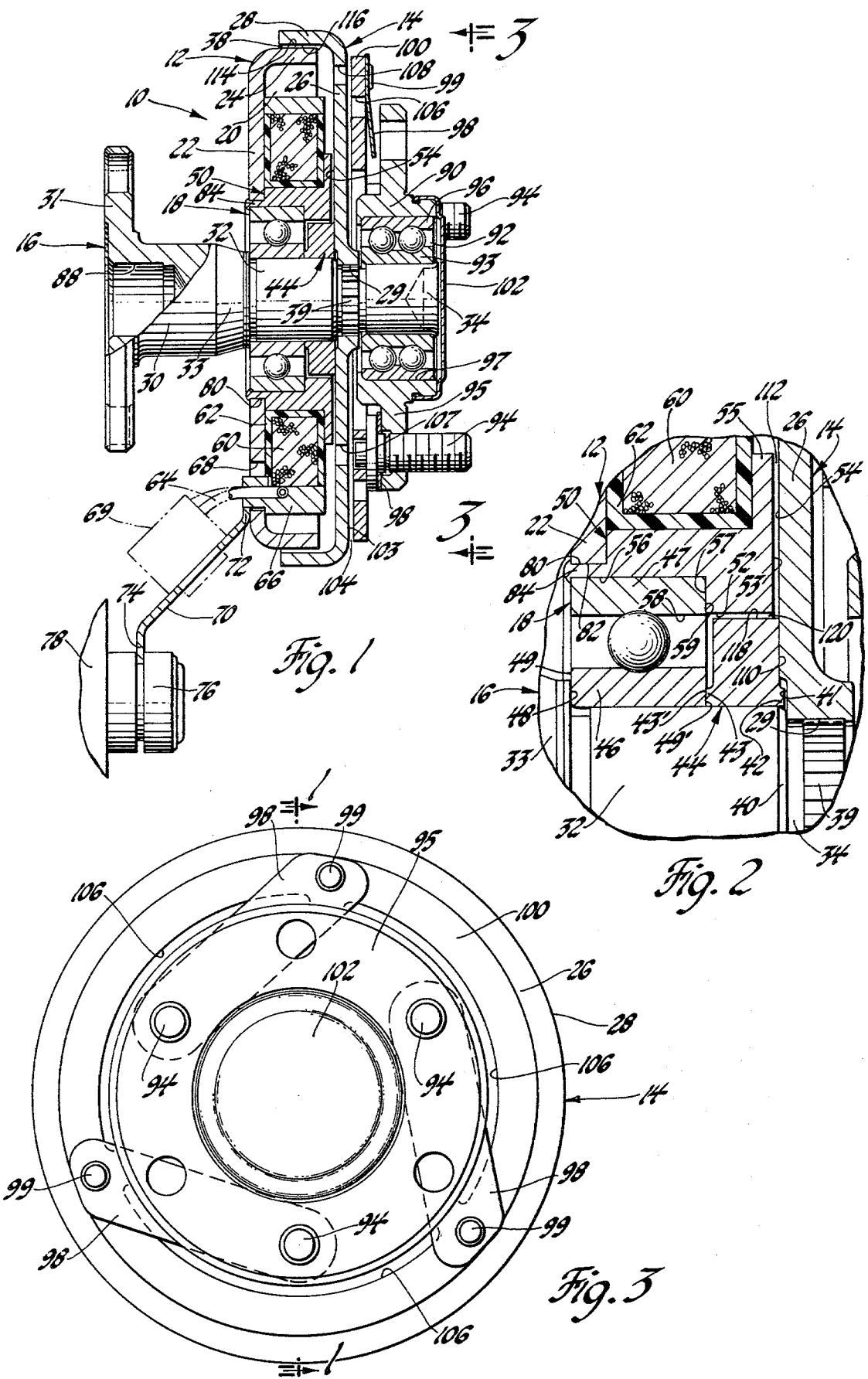

ELECTROMAGNETIC CLUTCH

This invention relates to electromagnetic clutches and more particularly to a fixed coil clutch of improved design which is used, for example for transmitting the driving force from a car engine to a cooling fan.

One instance of the manufacture of electromagnetic clutches in large quantities involves cooling fan clutches which can be engaged and disengaged from the engine rotation to allow the fan to rotate freely at low engine temperatures. In the case of an automotive engine fan it is a primary object to provide a fan clutch which is highly productive, light in weight, small in size and inexpensive while being highly efficient in performance.

According to the present invention there is provided an improved electromagnetic stationary coil clutch wherein a pair of housing members are provided formed as a pair of cup-like sheet metal housing members facing each other with their respective outer peripheries overlapping to form an outer radial air gap and spaced from each other to form a cavity therebetween.

It is another object of the present invention to provide a compact, ready assembled electromagnetic clutch as set forth in the above object which further provides housing locating means including a first and second spacer member for locating the housing members with respect to each other to provide an axial air gap and to control the flux transfer area of the outer radial air gap.

It is still another object of the invention to provide an improved electromagnetic clutch as set forth above wherein an inner radial air gap being adapted, in combination with the axial air gap to provide a composite inner radial and axial magnetic air gap with a defined magentic influx transfer area which cooperates with the magnetic flux transfer area defined by the outer radial magnetic air gap providing substantially equivalent flux transfer air gaps thereby obviating flux losses.

These and other objects and advantages of the present invention will become apparent from the following description of an embodiment of the invention illustrates in the accompanying drawings.

BRIEF DESCRIPTION OF THE DRAWINGS

FIG. 1 is a vertical sectional view through an electromagnetic clutch embodying one form of my invention taken substantially along the line 1—1 of FIG. 3;

FIG. 2 is an enlarged fragmentary sectional view of the bearing and spacer portions shown in FIG. 1; and FIG. 3 is an end view of the clutch shown in FIG. 1.

Referring to the drawings and more particularly to FIG. 1, there is shown an electromagnetic clutch assembly, generally indicated at 10, including a pair of housing members 12 and 14. The housing member 14 is adapted to be secured or installed on a shaft 16 in driving relationship thereto while a bearing 18 is affixed with respect to housing member 12 so that the housing members may rotate relative to each other. The housing members 12 and 14 are in the form of a pair of cup-like sheet metal members, which in the preferred embodiment are made from stamped steel parts. The open ends of the cup-like housing members are facing each other to form a cavity 20 therebetween.

The coil housing member 12 includes a radially extending base portion 22 and a cylindrical outer wall portion or outer periphery 24, while the housing member 14 includes a radially extending drive or base plate portion 26 and a cylindrical outer wall portion or outer periphery 28. The housing member 14 has its base plate portion 26 formed with a central aperture 29 adapted to be fixedly secured or installed on the shaft 16. As best seen in FIG. 1, the shaft 16 comprises a first enlarged section 30 including a coupling radial flange 31, an intermediate section 32 connected to section 30 by a conical portion 33, and a reduced free end section 34. The housing members are telescoped so that their peripheries 24 and 28 overlap. In the preferred arrangement the forward or right hand housing periphery 28 overlaps the rearward or left hand housing periphery 24 to form an outer radial air gap 38 therebetween.

It will be noted that the shaft section 34 includes a knurled surface portion 39 for holding the housing 14 on the shaft when the flanged aperture 29 is axially forced thereon. A shaft beveled portion 40 is provided on intermediate shaft portion 32 to allow recessed inner face portion 41 of the housing 14 to receive in axial spaced relation stepped portion 42 of a first ring spacer 44 to be described.

As best seen in FIG. 2, the journal bearing 18 is concentric to the shaft section 32 and includes relatively rotatable coaxial inner 46 and outer 47 races, with the inner race mounted on the shaft section 32 in a press fit manner for rotation therewith. It will be noted that shaft stop means in the form of a shaft shoulder 48 is provided for engaging one end 49 of the inner race thereby axially locating the bearing 18 relative to the shaft.

The coil housing 12 is supported on the bearing outer race 47 by means of a hub member or second spacer 50 formed with a stepped axial bore encircling the shaft section 32 and axially positioned intermediate the coil housing 12 and the drive plate housing 14. The second spacer 50 is adapted for engaging the bearing 18 and the other or rearward housing member 12. In this manner the spacer 50 is adapted to locate the other housing member 12 with respect to the bearing 18 and to locate the housing periphery 24 with respect to the one housing member periphery 28 when the housing member 12 is installed on the shaft 16.

As viewed in FIG. 2, the hub member or second spacer stepped axial bore is formed with its smaller bore portion 52 one end face 53 directed toward inner face 54 of housing member base plate portion 26. It will be noted that the second spacer 50 has its one end face 53 formed with a radially extending flange 55 providing a coplanar radial extension of the spacer end face 53. The hub member or second spacer's stepped bore is formed with its larger bore portion 56 and its smaller bore portion 52 of predetermined diameter defining a radially extending internal stop shoulder 57 facing toward the shaft flanged end. Further, the spacer 50 stepped axial bore has its larger bore portion 56 of a predetermined diameter to provide press fit engagement on the journal bearing outer race 47. It will be seen that the radius of the outer race inner annular surface 58 is substantially equal to the smaller bore radius 52 with the second spacer 50 being axially located with its internal stop shoulder engaging one forward end 59 of the outer race 47.

As seen in FIG. 1 means, in the form of an external peripheral notch on annular electromagnetic coil 60 is wound upon a bobbin 62 in a well known manner with leads 64 therefrom extending through a tubular offset extension 66 of the bobbin. The extension 66 protrudes through an aperture 68 in the base portion 22 of coil housing 12 with the leads 64 connected to a terminal member 69 fixed on an anti-rotation tether or mounting arm assembly 70. The arm 70 has its one flanged end 72 suitably secured to coil housing 12, such as by welding, with the other end 74 secured as by means of a grommet 76 to a fixed support member which in the disclosed form is an engine block partially indicated at 78.

It will be seen in FIGS. 1 and 2 that means are provided on spacer larger bore portion end, in the form of an external peripheral notch 80, for receiving a central aperture 82 in the coil housing base portion 22. The notch 80 defines a sleeve portion 84 having an axial extent beyond the bearing races and the rear face of base portion 22. Upon the sleeve portion 84 free edge being rolled or upset as shown, both the coil housing and the bearing 18 are secured to the second spacer 50.

In the form of the invention shown in the drawings for purposes of illustration, the improved clutch is supported on a stub shaft with the adaptor flange 31 adapted to abut a complementary flange (not shown) on a driving shaft (not shown) and bolted thereto with the driving shaft received in axial blind bore 88. The driving shaft, such as a water pump impeller shaft, is driven by an automotive engine (not shown) such as by a conventional belt drive.

FIG. 1 shows a sleeve member 90 rotatably mounted by anti-friction dual roller bearing 92 inner race 93 being pressed onto the shaft section 34. Suitable fan blades, not shown, are secured by fan bolts 94 in sleeve annular disc 95 to the sleeve member 90. Outer race 96 is press fitted in fan sleeve aperture 97. The armature 100 is retained adjacent the drive plate 26 by a plurality of leaf spring members 98 which are secured by any suitable means at their inner free ends to the annular disc opposite the threaded end of the fan bolts 94. The outer peripheral ends of the leaf spring members 98 are secured, such as by rivets 99 on the opposite side of the armature plate 100. A suitable dust cover 102 is snap-fitted on the outer end of fan mounting sleeve 90.

The armature plate 100 is shown in a deenergized position adjacent to the outer face 103 of the housing member drive plate 26, there being a variable length radially extending axial gap or space 104 therebetween. A plurality of conventional circumferentially spaced concentric arcuate slots 106 are formed in the armature plate 100. A plurality of circumferentially spaced, concentric arcuate rotor housing drive plate inner 107 and outer 108 slots are formed in the drive plate. It will be seen that the armature slots 106 are radially intermediate the drive plate inner and outer slots 107 and 108. The above-described slot arrangement provides a 4-pass or "4-pole" magnetic flux path.

By virtue of the above-described arrangement of parts it will be seen that the first ring spacer 44 is interposed with its forward radially extending face 110 in flush engaging relationship with the housing member inner face 54. Further, the ring spacer inner face 43' of its stepped portion 43 is in flush engaging relationship with inner race forward edge 49' to fixedly axially locate the drive plate inner face 54 in a predetermined radial plane. In addition, the second hub spacer 50 shoulder 57 is in flush engagement with the outer race forward edge 59 to fixedly locate the forward face 53 of the spacer 50, whereby an axial magnetic air gap 112 of predetermined axial spacing or length is achieved. It will be noted that the second hub spacer also engages the housing member 12 by means of the external peripheral notch 80 seating the central aperture 82 to locate the outer cylindrical surface 114 of the periphery 24 with respect to the inner cylindrical surface 116 of the periphery 28. In this way the outer radial magnetic air gap 38 is fixed to provide a predetermined gap area and gap radial dimension.

As viewed in FIG. 2, it will be seen that the ring spacer 44 outer cylindrical surface 118 cooperates with the hub spacer smaller bore 52 to establish a predetermined inner radial magnetic air gap 120. The result is that the inner radial air gap 120 provides additional magnetic air gap area, in combination with the axial magnetic air gap 112 thereby forming a composite inner radial and axial magnetic air gap with a defined magnetic flux transfer area which cooperates with the magnetic flux transfer area defined by the outer radial gap providing substantially equivalent flux transfer air gaps to obviate flux losses.

While the embodiment of the present invention as herein disclosed constitutes a preferred form, it is to be understood that other forms might be adopted.

The embodiments of the invention in which an exclusive property or privilege is claimed are defined as follows:

1. A compact, readily assembled electromagnetic clutch comprising a pair of cup-like sheet metal housing members facing each other and overlapping at their respective outer peripheries in a manner to form an outer radial air gap and spaced from each other to form a cavity, one of said housing members being adapted for installation on a shaft in driving relationship thereto, an electromagnetic coil in said cavity, an armature adjacent to one of said housing members and operative upon energization of said coil to interconnect said armature and said one of said housing members in driving relationship, a bearing affixed with respect to the other of said housing members so that the housing members may rotate relative to each other, and means for locating said housing members with respect to each other to provide an axial air gap and to control the flux transfer area of said outer radial air gap, said means including a first spacer interposed in engaging relationship between said one housing member and said bearing to locate said housing members axially with respect to each other, and a second spacer engaging said bearing and the other of said housing members to locate said other housing member with respect to said bearing and to locate the periphery of said other housing member with respect to the periphery of said one housing member when said one housing member is installed on said shaft, and both of said spacers cooperating with each other and said bearing to space said second spacer from said one housing member to form said axial air gap directly therebetween and additionally form an inner radial air gap directly between said spacers in parallel with said axial air gap.

2. A compact, readily assembled electromagnetic clutch comprising a pair of cup-like sheet metal housing members facing each other and overlapping at their respective outer peripheries in a manner to form an outer radial air gap and spaced from each other to form a cavity, one of said housing members being adapted for installation on a shaft in driving relationship thereto, an electromagnetic coil in said cavity, an armature adjacent to one of said housing members and operative upon energization of said coil to interconnect said armature and said one of said housing members in driving relationship, a bearing affixed with respect to the other of said housing members so that the housing members may rotate relative to each other, and means for locating said housing members with respect to each other to provide an axial air gap and to control the flux transfer area of said outer radial air gap, said means including a first spacer interposed in engaging relationship between said one housing member and said bearing to locate said housing members axially with respect to each other and a second spacer engaging said bearing and the other of said housing members to locate said other housing member with respect to said bearing and to locate the periphery of said other housing member with respect to the periphery of said one housing member when said one housing member is installed on said shaft, and both of said spacers cooperating with each other and said bearing to space said second spacer from said one housing member to form both said axial air gap directly therebetween and additionally form an inner radial air gap directly between said spacers in parallel with said axial air gap with the combined magnetic flux transfer area of said inner radial air gap and said axial air gap substantially equivalent to that of said outer radial air gap, said second spacer being configured in a plane parallel to said one housing member to control the flux transfer area of said axial air gap.

3. A compact, readily assembled electromagnetic clutch comprising a pair of cup-like sheet metal housing members facing each other and overlapping at their respective outer peripheries in a manner to form an outer radial air gap of defined opposed surface areas and spaced from each other to form a cavity, one of said housing members being adapted for installation on a shaft in driving relationship thereto, an electromagnetic coil in said cavity, an armature adjacent to one of said housing members and operative upon energization of said coil to interconnect said armature and said one of said housing members in driving relationship, a bearing affixed with respect to the other of said housing members so that the housing members may rotate relative to each other, and means for locating said housing members with respect to each other to provide an axial air gap and to control the flux transfer area of said outer radial air gap defined opposed surface areas, said means including a ring spacer interposed in engaging relationship between said one housing member and said bearing to locate said housing members axially with respect to each other, and a hub spacer formed with a stepped axial bore encircling said shaft with its smaller bore portion of a predetermined diameter and its one end facing said one housing member, said hub spacer stepped bore defining a radially extending internal stop shoulder facing toward said other housing member, said hub member's stepped axial bore having its larger bore portion of a predetermined diameter for press fit support on said bearing, said spacer ring having its outer annular surface of a predetermined diameter for telescopic reception in said smaller bore portion whereby an inner radial magnetic air gap is defined between said hub member's smaller bore portion and said spacer ring outer annular surface, said hub spacer engaging said bearing and the other of said housing members to locate said other housing member with respect to said bearing and to locate the periphery of said other housing member with respect to the periphery of said one housing member when said one housing member is installed on said shaft, and both of said spacers cooperating with each other and said bearing to space said hub spacer from said one housing member to form said axial air gap, said hub spacer being configured in a plane parallel to said one housing member to control the flux transfer area of said axial air gap, whereby said inner radial air gap providing a predetermined gap area, in combination with said axial air gap, thereby forming a composite radial and axial magnetic air gap with a defined magnetic flux transfer area which cooperates with said magnetic flux transfer area defined by said outer radial air gap providing substantially equivalent radially outer and composite flux transfer air gaps to obviate flux losses.

* * * * *